INVENTOR
Walter Thomas Underhill
BY
Baldwin Wight Diller & Brown
ATTORNEYS

Feb. 10, 1970 W. T. UNDERHILL 3,495,029

COLOUR TELEVISION CAMERAS HAVING A LUMINANCE TUBE AND COLOUR TUBES

Filed Nov. 16, 1966 2 Sheets-Sheet 2

INVENTOR
Walter Thomas Underhill
BY
Baldwin Wight Diller & Brown
ATTORNEYS

United States Patent Office 3,495,029

Patented Feb. 10, 1970

3,495,029

COLOUR TELEVISION CAMERAS HAVING A LUMINANCE TUBE AND COLOUR TUBES

Walter Thomas Underhill, Chelmsford, Essex, England, assignor to The Marconi Company Limited, London, England, a British company Filed Nov. 16, 1966, Ser. No. 594,715
Claims priority, application Great Britain, Dec. 10, 1965, 52,653/65
Int. Cl. H04n 9/08
U.S. Cl. 178—5.4 3 Claims

ABSTRACT OF THE DISCLOSURE

A colour television camera including a luminance tube and separate colour tubes is described. Light from a subject of transmission is divided between the luminance tube, on the one hand, and the colour tubes, on the other, by a dichroic reflector. The reflector has its colour discrimination chosen to suit the required spectral response curve of the luminance channel and to provide the luminance tube with only the spectral light components it requires.

This invention relates to colour television cameras and more specifically to colour television cameras of the kind in which there is a separate camera tube, (generally termed the luminance tube) which is additional to the tubes for providing the component colour signals (the colour tubes) and which provides the luminance signal.

The nature, features and advantages of the invention will be more clearly understood by reference to the following detailed description, the appended claims and the accompanying drawings in which:

Figure 1:
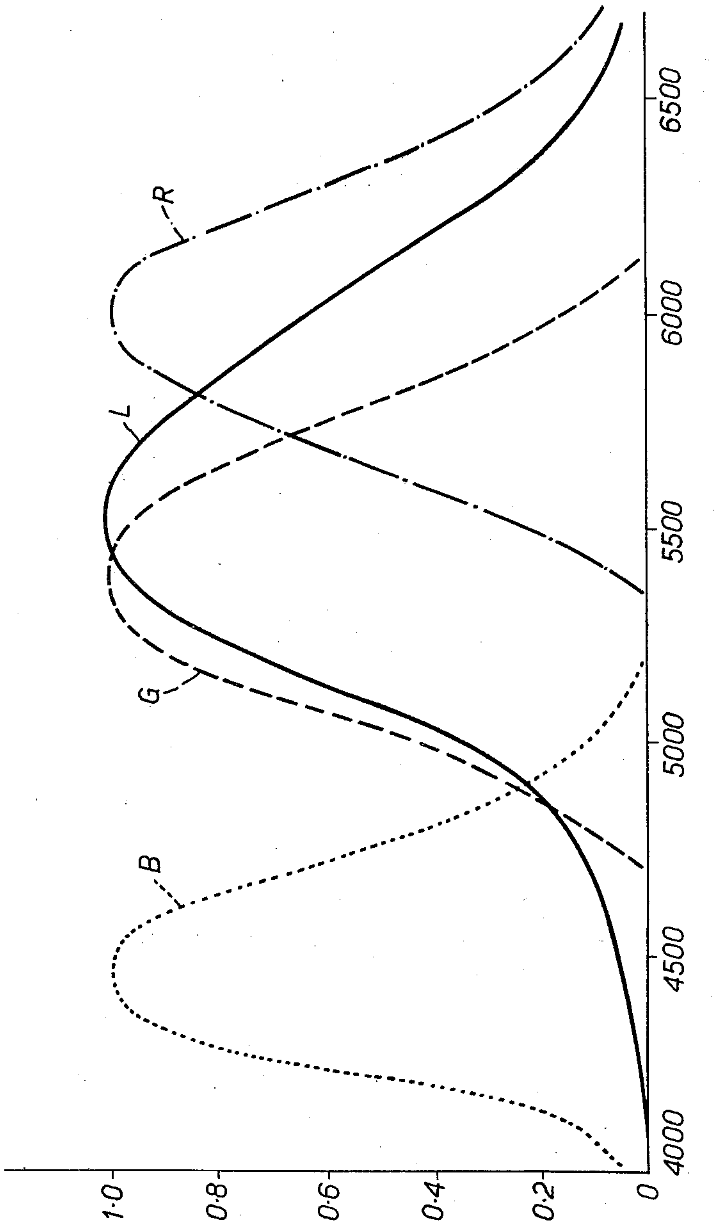
FIGURE 1 shows a normalized spectral response curve for a luminance channel and normalized response curves for colour channels of a television camera.

It is normal present day practice, in colour television cameras of this well known kind, to direct light from the subject of transmission to the luminance tube via a partly silvered mirror which reflects a portion of said light to said tube via a light filter (the need for which will be explained later) and transmits the remainder to the colour tubes between which it is divided by means of dichroic mirrors.

This known practice, which, as will be appreciated, involves the splitting off of light to the luminance tube by means of an ordinary part-silvered mirror which is not colour-discriminatory, is not efficient as respects utilisation of the available light from the subject of transmission. This is because the luminance tube does not in fact require equal intensity of illumination at all wavelengths of light. On the contrary it is very desirable for the spectral response of the luminance signal channel to conform fairly closely to a more or less standard luminosity function which is typified by the full line curve L of FIGURE 1. The curve is, of course, not exactly the same for all tubes but the one shown, with a rounded peak at about 5500 A. and falling away on both sides thereof to a very low response at about 4500 A. (and below) and at about 6500 A. (and above) is typical. (In FIGURE 1 the ordinates are relative light strengths and the abscissae are light wavelengths in A.). In normal present day practice the spectral response of the luminance tube is made to conform approximately to the required response curve (L of FIGURE 1) by inserting the light filter previously mentioned in the light path between the partly silvered mirror and the luminance tube, this filter being designed to make allowance for the response of the luminance tube itself. The spectral components of the light not required by the luminance tube but reflected towards it by the part silvered mirror are, accordingly, dissipated in the filter. In addition to the loss of light thus occasioned there is, of course, the overall insertion loss of the filter itself. The present invention seeks to avoid these defects and make more efficient use of the light from the subject of transmission thus materially improving the sensitivity of the camera.

According to this invention, in a colour television camera of the kind in which there is provided a luminance tube, separate from and additional to the colour tubes, light from a subject of transmission is divided between the luminance tube, on the one hand, and the colour tubes on the other, by means of a dichroic reflector the colour discrimination of which is chosen at least approximately to suit the required spectral response curve of the luminance channel and to provide the luminance tube substantially only with the spectral components of light it requires.

With an improved arrangement in accordance with this invention and by reason of the use therein of the dichroic reflector in place of the hitherto customary part-silvered mirror having no colour discrimination, light directed to the luminance tube is approximately confined to that required thereby, the hitherto usual filter in the light path to the luminance tube is rendered unnecessary and the light not passed towards the luminance tube and therefore available for division between the colour tubes, is increased.

FIGURE 1 shows, in addition to the normalised spectral response curve L (already referred to) for the luminance channel, typical normalised spectral response curves for the colour signal channels, the dotted line curve B being for the blue channel, the broken line curve G being for the green channel and the chain line curve R being for the red channel, of a camera having a luminance tube and blue green and red colour tubes. The relation of the curves B, G, R and L shows that, if the dichroic reflector provided by this invention is designed to reflect to the luminance tube light approximately corresponding to what is called for by the curve L, useful additional amounts of light (as compared to what would be transmitted by the customary part-silvered mirror) will be transmitted to the red and blue channels. There is, as will be apparent from FIGURE 1, only a small amount of additional light available for the green channel because the luminance and green tubes require maximum light at fairly closely adjacent wavelengths. There is, however, some saving even as respects green because of the elimination of the insertion loss of the hitherto usual luminance filter. In any event, because the loss in the optical path to the green tube is, in a typical practical case, two or three times less than that to the red and blue tubes, saving of light as respects the green tube is considerably less important.

As will be already understood, the dichroic reflector provided by this invention is designed to give the appropriate division of light in the region of the peaks of the green and luminance responses (curves G and L of FIGURE 1). A typical practical proportion for the division is 30% (or thereabouts) to the luminance tube and 70% (or thereabouts) to be shared between the colour tubes.

A preferred camera in accordance with this invention comprises a luminance tube and blue green and red colour tubes; a dichroic mirror positioned and adapted to receive light from a subject of transmission and to reflect to the luminance tube a portion thereof, suited as respects colour component reflection, to the required spectral response curve of the luminance channel and to transmit the remainder of the received light; and blue-reflecting red-reflecting and green-reflecting dichroic mirrors positioned and adapted to reflect light respectively to the blue red and green colour tubes, one of the three last mentioned dichroic mirrors being positioned to receive light transmitted by the first mentioned dichroic mirror and another of said three last mentioned dichroic mirrors being positioned to receive light transmitted by said one mirror and to transmit light to the third of said three last mentioned dichroic mirrors.

Trimming filters and relay lenses may be provided, in accordance with known practice, in the individual light paths to the different tubes.

Figure 2:
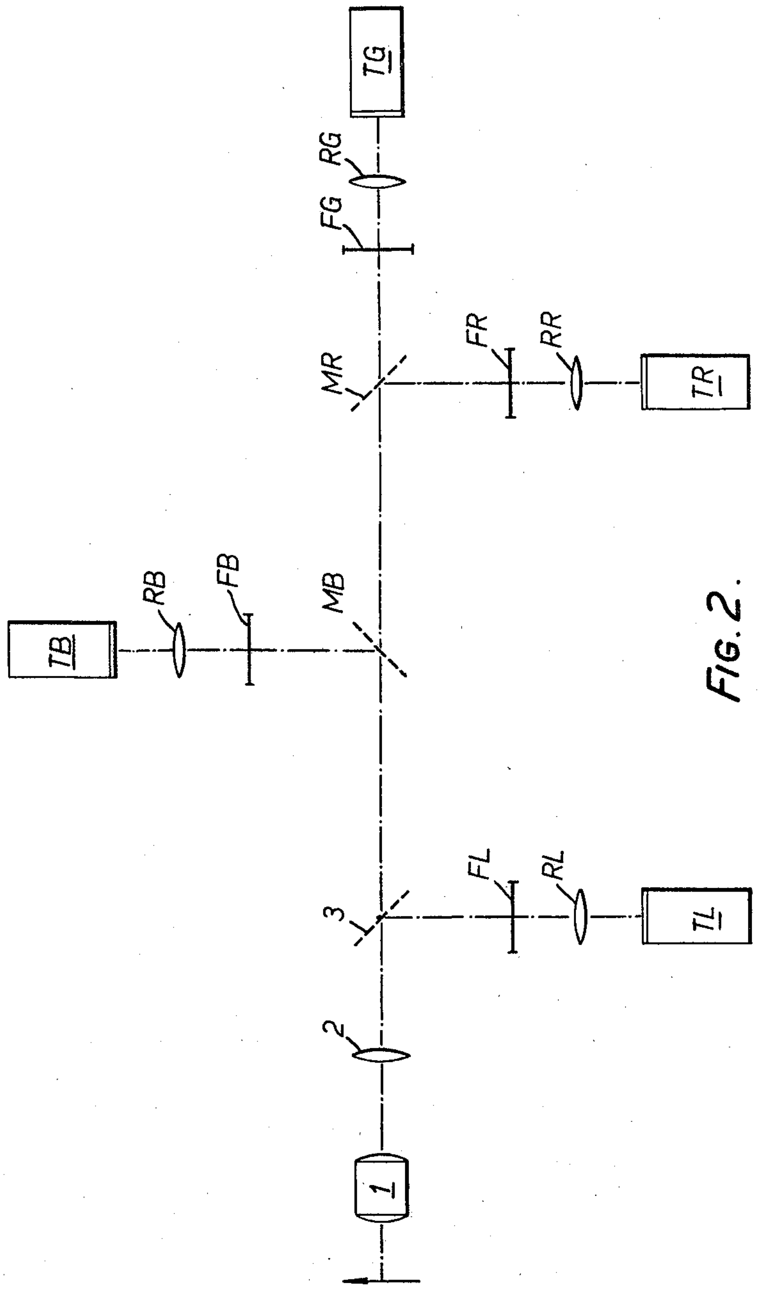
FIGURE 2 shows, purely schematically and so far as necessary to an understanding of the invention, one form of a television camera constructed in accordance therewith.

Referring to FIGURE 2 light from a subject of transmission, represented by an arrow, is passed via the customary objective lens 1 and field lens 2 to a dichroic mirror 3. This is the mirror which, in accordance with this invention, replaces the hitherto employed part-silvered mirror. It reflects about 30% of the light, having maximum intensity near green and as represented by curve L of FIGURE 1, via a trimming filter FL and relay lens RL to the luminance tube TL. It is emphasised that the filter FL is a mere trimming filter and is not the counterpart of the filter used hitherto between the previously employed part-silvered mirror and the luminance tube.

The remaining approximately 70% of the light is transmitted by the dichroic mirror 3 to the dichroic mirror MB which reflects blue light via the trimming filter FB and relay lens RB to the blue tube TB and transmits light to the red reflecting dichroic mirror MR. This reflects red light via the trimming filter FP and relay lens RR to the red tube TR. The light passed by the dichroic mirror MR—green light—passed via the trimming filter FG and relay lens RG to the green tube TG.

In the illustrated embodiment the dichroic mirror 3 reflects light to the luminance tube TL and transmits light to the colour tubes. It will be apparent, however, that the invention could be carried into effect by means of a dichroic mirror arrangement which transmitted light of the required colour to the luminance tube and reflected light to be shared among the colour tubes.

I claim:

1. An improved colour television camera of the kind in which there is provided a luminance tube, separate from an additional to colour tubes, the improvement including means for dividing light from a subject of transmission between the luminance tube, on the one hand, and the colour tubes on the other, said means comprising a dichroic reflector having a colour discrimination at least approximately suiting the required spectral response curve of a luminance channel and to provide the luminance tube substantially only with the spectral components of light it requires.

2. A camera as claimed in claim 1 wherein the dichroic mirror is designed to give a division of light of about 30% to the luminance tube and about 70% to be shared between the colour tubes.

3. A colour television camera comprising a luminance tube and blue green and red colour tubes; a first dichroic mirror positioned to receive light from a subject of transmission and to reflect to the luminance tube a portion thereof, suited as respects colour component reflection, to the required spectral response curve of the luminance channel and to transmit the remainder of the received light; and blue-reflecting red-reflecting and green-reflecting dichroic mirrors positioned and adapted to reflect light respectively to the blue red and green colour tubes, one of the three last mentioned dichroic mirrors being positioned to receive light transmitted by the first mentioned dichroic mirror and another of said three last mentioned dichroic mirrors being positioned to receive light transmitted by said one mirror and to transmit light to the third of said three last mentioned dichroic mirrors.

References Cited

UNITED STATES PATENTS

| | | | |
|---|---|---|---|
| 3,089,978 | 5/1963 | Bendell et al. | |
| 3,330,904 | 7/1967 | Gebel | 178—5.2 |

ROBERT L. GRIFFIN, Primary Examiner

RICHARD MURRAY, Assistant Examiner

U.S. Cl. X.R.

178—5.2